Sept. 27, 1938. H. G. McMENNAMIN 2,131,229
DOG'S PLAYTHING
Filed Sept. 25, 1937
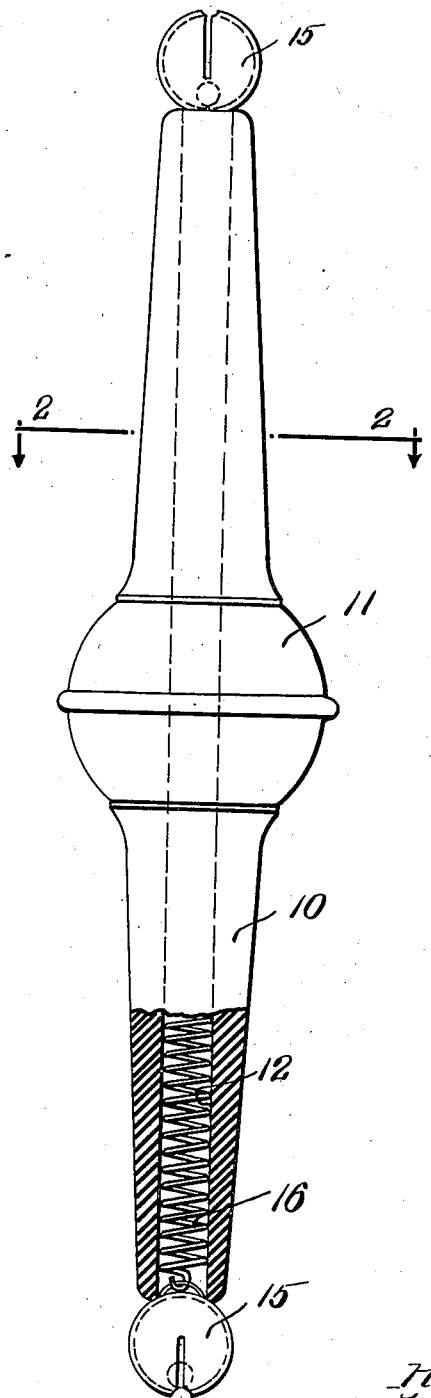
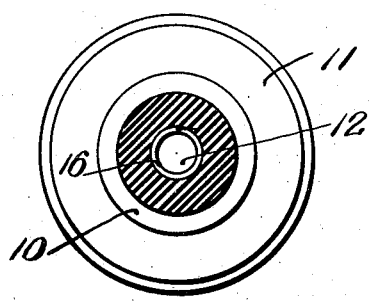
Inventor:
Harold G. McMennamin Patented Sept. 27, 1938

2,131,229

UNITED STATES PATENT OFFICE 2,131,229

DOG'S PLAYTHING

Harold G. McMennamin, Rumford, Maine

Application September 25, 1937, Serial No. 165,735

4 Claims. (Cl. 46—175)

This invention relates to an improvement in a dog's plaything so constructed that when carried in the dog's mouth or pushed along by the dog's nose or paw it will emit one or more distinctive musical notes. More specifically the plaything has the general conformation of a stick or baton, having at its center an enlarged ball-like portion and at each end a bell. Due to the ball-like central portion the plaything, when resting on the ground, pavement or other planar surface tilts so that it also rests on one end or the other, the other end being raised whereby when pushed along by the dog, usually by his nose or a paw, it will emit its distinctive note or notes. The plaything is normally carried by the dog with its ball-like center portion in the mouth and the bell carrying ends free so that the note or notes can be emitted.

One embodiment of this invention is shown in the accompanying drawing, in which:

Fig. 1 is an elevational view of the plaything with one portion broken away; and Fig. 2 is a sectional view taken along the line 2—2 in Fig. 1.

The plaything is made in the form of a baton 10 having an enlarged ball-like portion 11 at the center. The baton is made of relatively hard material so that it will not be injured by the dog's teeth, and has a hole 12 extending longitudinally through the center and open at each end of the baton. As indicated on the drawing, the baton of the illustrated plaything is of hard rubber and will withstand without injury the rough usage to which it will be subjected.

At each end of the baton is a bell 15 which will emit the distinctive note or notes when the plaything is moved. The bells are connected and secured in place by a coil spring 16 extending through the hole 12. The bells 15 may, however, be fixed to the ends of the baton permanently if desired or by other means than the spring. The spring, however, is of advantage since the bells can easily be replaced if broken or injured.

The dog to which the plaything is given quickly recognizes the note or notes emitted by the plaything and will respond instantly if the plaything is shaken within his hearing.

While one embodiment of the invention has been described and shown, it will be understood that the invention is not limited thereto and that the conformation of the plaything may be varied or other embodiments made without departing from the spirit and scope thereof as set forth in the following claims.

I claim:

1. A dog's toy comprising a baton having a central enlarged portion and bells carried by the baton and spaced from said central enlarged portion, said bells being soundable upon slight movement of the toy.

2. A dog's toy comprising a baton having a central enlarged portion and bells carried by the baton at each end thereof, said bells being soundable upon slight movement of the toy.

3. A dog's toy comprising a baton having a central enlarged portion and a hole extending longitudinally through the center thereof and open at each end, a bell at each end of the baton and a spring in the passage connecting the bells and holding them yieldingly at the ends of the baton, said bells being soundable upon slight movement of the toy.

4. A dog's toy comprising a baton having a central enlarged portion of annular cross section and bells carried by the baton and spaced from said enlarged portion, said bells being soundable upon slight movement of the toy.

HAROLD G. McMENNAMIN.